May 10, 1955  J. R. NORRIS  2,708,136
PRISMATIC WINDOW STRUCTURE
Filed Feb. 15, 1954

INVENTOR.
JOHN R. NORRIS.
BY
Willard S. Groen
ATTORNEY.

United States Patent Office 2,708,136
Patented May 10, 1955

2,708,136
PRISMATIC WINDOW STRUCTURE

John R. Norris, Phoenix, Ariz.

Application February 15, 1954, Serial No. 410,281

2 Claims. (Cl. 296—44)

This invention pertains to improvements in window structures and is particularly adapted to window structures for vehicles and conveyances for better visibility of passengers in said devices.

One of the objects of this invention is to provide an improved window structure for a vehicle which gives an improved and more desirable view for the passengers in such vehicle.

Still another object of this invention is to provide an improved prismatic reflecting window for passengers on airlines, buses and trains or the like, who have to sit on the inside rows in such vehicles and would ordinarily not have a satisfactory view of the outside surroundings.

Still another object of this invention is to provide an improved prismatic window structure for a vehicle to enable passengers on the inside seats to have an equally good view from their normal sitting position in the inside seat as that of the seat adjacent the window in such vehicles.

Further features and advantages of this invention will appear from a detailed description of the drawings in which.

Figure 1:
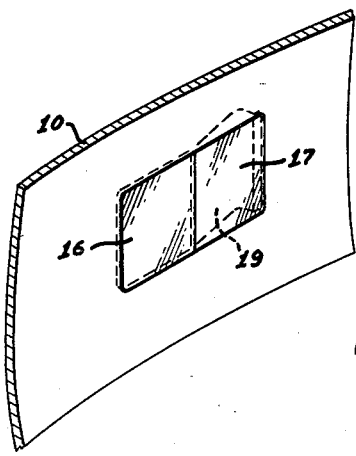
Fig. 1 is an inside fragmentary perspective view of a window structure incorporating the features of this invention.
Figure 2:
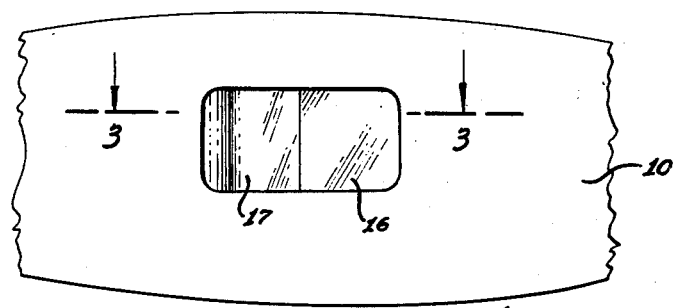
Fig. 2 is an outside view of the window structure shown in Fig. 1.
Figure 3:
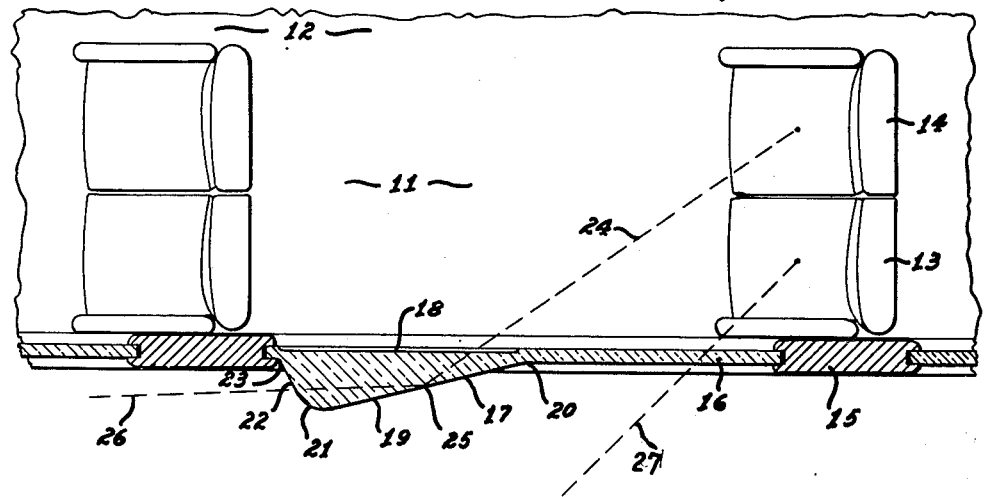
Fig. 3 is a fragmentary section on the line 3—3 of Fig. 2.

As exemplary of one embodiment of this invention there is shown a vehicle comprising an airliner having a fuselage 10 forming the passenger compartment 11 of the airplane. As is usual in such structures there is provided a central aisle 12 and two or more seats 13 and 14 between the aisle 12 and the outside wall 15 of the passenger compartment.

In conventional structures of this type the passenger on the inside seat 14 is not able to look out through the ordinary window of the vehicle to see the surroundings and therefore must ride many hours without knowing where he is or getting any pleasure, enjoyment and relaxation from the trip. Therefore, one of the primary purposes of this invention is to improve and give the inside passenger in the seat 14 an equally good view to that of the person in seat 13 of the surrounding area through which he is traveling.

This comprises the providing of the usual plain window 16 adjacent the outside seat 13 and to then provide in front of the window 16 a prismatic windowpane 17 having an inside surface 18 substantially parallel to the wall 15 and the pane 16. The outside surface 19 extends from a point 20 forwardly and outwardly to a point 21 where it then curves inwardly along the line 22 in suitable streamlined manner to the point 23 with the inside surface 18. Preferably the plane 17 is made of suitable transparent plastic of light weight and suitable durability of a well known character so that the person sitting in the seat 14 may have a line of sight indicated by the line 24 which reflects at the point 25 from the inside of the surface 19 of the pane 17 so that the passenger's ultimate view from the inside seat 14 is along the line 26. The party in the outside seat 13 may view in the ordinary manner out through the regular pane 16 indicated by the line of sight 27. Thus, the inside passenger in seat 14 has an equally good view without movement from his normal sitting position in the inside seat of the area to one side and forward of the plane equal to that of the party in the outside seat 13 looking through the normal window 16. Thus a more pleasureable and satisfactory condition is provided for the passenger in the vehicle.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A window structure for a vehicle having a passenger compartment, a central aisle, an outside wall, an outside seat adjacent said wall, an inside seat between said outside seat and said aisle, and a window structure in said wall to provide equally good visibility from both of said seats comprising, a plain window in said wall adjacent said outside seat and a prismatic window in said wall located adjacent to said plain window forwardly of said vehicle having a common flat inside surface, said prismatic window having a thin edge adjacent the front edge of said plain window and a thick edge toward the forward portion of said vehicle forming an angularly disposed outside surface on said prismatic window and a viewing surface on the forward edge of said prismatic window positioned at right angles to said angularly disposed surface, said angularly disposed surface acting to reflect a view from the front of said vehicle received through said viewing surface to a passenger in said inside seat.

2. A window structure comprising, a plain window and a prismatic window formed integral therewith, having a common inside surface parallel to a supporting panel structure in which said window structure is mounted, an outer window surface for said plain window arranged parallel to said inside surface and panel, an angularly disposed flat outside surface for said prismatic window beginning at the juncture with said plain window and sloping outwardly therefrom to the opposite edge of said prismatic window, a viewing surface on the outer edge of said prismatic window extending from said inside surface and merging with the outer edge of said angularly disposed flat outside surface for said prismatic window and at a right angle thereto, said prismatic window surfaces being so arranged that an object may be viewed through said viewing surface in a direction substantially parallel to said inside surface from a position inside and behind the outer edge of said plain window.

References Cited in the file of this patent
UNITED STATES PATENTS

| | | |
|---|---|---|
| 586,214 | Basquin | July 13, 1897 |
| 1,678,479 | Patten et al. | July 24, 1928 |
| 1,712,112 | Keuffel | May 7, 1929 |